United States Patent
Visser et al.

(10) Patent No.: US 11,705,147 B2
(45) Date of Patent: Jul. 18, 2023

(54) MIXED ADAPTIVE AND FIXED COEFFICIENT NEURAL NETWORKS FOR SPEECH ENHANCEMENT

(71) Applicant: QUALCOMM Incorporated, San Diego, CA (US)

(72) Inventors: Erik Visser, San Diego, CA (US);
Vahid Montazeri, San Diego, CA (US);
Shuhua Zhang, San Diego, CA (US);
Lae-Hoon Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 17/243,434

(22) Filed: Apr. 28, 2021

(65) Prior Publication Data
US 2021/0343306 A1  Nov. 4, 2021

Related U.S. Application Data

(60) Provisional application No. 63/017,155, filed on Apr. 29, 2020.

(51) Int. Cl.
*G10L 21/0208* (2013.01)
*G10L 25/30* (2013.01)
(Continued)

(52) U.S. Cl.
CPC .......... *G10L 21/0208* (2013.01); *G06N 3/044* (2023.01); *G06N 3/045* (2023.01);
(Continued)

(58) Field of Classification Search
CPC ................. G10L 21/0208; G10L 25/30; G10L 2021/02082
(Continued)

(56) References Cited

U.S. PATENT DOCUMENTS

| | | | |
|---|---|---|---|
| 2013/0325775 A1* | 12/2013 | Sinyavskiy | G06N 3/08 706/25 |
| 2020/0211580 A1* | 7/2020 | Lee | G06F 17/18 |
| 2020/0372894 A1* | 11/2020 | Zhai | G10K 11/17823 |

OTHER PUBLICATIONS

S. K. Roy and C. F. Rodrigues, "Echo Canceller Using Error Back Propagation Algorithm," 2014 International Conference on Soft Computing and Machine Intelligence, New Delhi, India, 2014, pp. 98-101, doi: 10.1109/ISCMI.2014.33. (Year: 2014).*

* cited by examiner

*Primary Examiner* — Bharatkumar S Shah
(74) *Attorney, Agent, or Firm* — QUALCOMM Incorporated

(57) ABSTRACT

Systems, methods and computer-readable media are provided for speech enhancement using a hybrid neural network. An example process can include receiving, by a first neural network portion of the hybrid neural network, audio data and reference data, the audio data including speech data, noise data, and echo data; filtering, by the first neural network portion, a portion of the audio data based on adapted coefficients of the first neural network portion, the portion of the audio data including the noise data and/or echo data; based on the filtering, generating, by the first neural network portion, filtered audio data including the speech data and an unfiltered portion of the noise data and/or echo data; and based on the filtered audio data and the reference data, extracting, by a second neural network portion of the hybrid neural network, the speech data from the filtered audio data.

30 Claims, 7 Drawing Sheets

(51) Int. Cl.
  *G06N 3/08*     (2023.01)
  *G06N 3/044*    (2023.01)
  *G06N 3/045*    (2023.01)

(52) U.S. Cl.
  CPC ............. *G06N 3/08* (2013.01); *G10L 25/30* (2013.01); *G10L 2021/02082* (2013.01)

(58) Field of Classification Search
  USPC ........................................................ 704/200
  See application file for complete search history.

500

```
┌─────────────────────────────────────────────────────────────┐
│  RECEIVE, BY A FIRST NEURAL NETWORK PORTION OF A HYBRID NEURAL │
│  NETWORK SYSTEM, AN INPUT INCLUDING AUDIO DATA AND REFERENCE  │
│                            DATA                              │
│                            502                               │
└─────────────────────────────────────────────────────────────┘
                              ↓
┌─────────────────────────────────────────────────────────────┐
│  BASED ON ADAPTED COEFFICIENTS OF THE FIRST NEURAL NETWORK   │
│  PORTION, FILTER, BY THE FIRST NEURAL NETWORK PORTION, A PORTION │
│  OF THE AUDIO DATA INCLUDING NOISE DATA AND/OR ECHO DATA     │
│                            504                               │
└─────────────────────────────────────────────────────────────┘
                              ↓
┌─────────────────────────────────────────────────────────────┐
│  BASED ON THE FILTERING OF THE PORTION OF THE AUDIO DATA,    │
│  GENERATE, BY THE FIRST NEURAL NETWORK PORTION, FILTERED AUDIO │
│  DATA INCLUDING SPEECH DATA AND AN UNFILTERED PORTION OF THE │
│        NOISE DATA AND/OR THE ECHO DATA                       │
│                            506                               │
└─────────────────────────────────────────────────────────────┘
                              ↓
┌─────────────────────────────────────────────────────────────┐
│  BASED ON THE FILTERED AUDIO DATA AND THE REFERENCE DATA,    │
│  EXTRACT, BY A SECOND NEURAL NETWORK PORTION OF THE HYBRID   │
│  NEURAL NETWORK SYSTEM, THE SPEECH DATA FROM THE FILTERED    │
│                         AUDIO DATA                           │
│                            508                               │
└─────────────────────────────────────────────────────────────┘
```

FIG. 5

MIXED ADAPTIVE AND FIXED COEFFICIENT NEURAL NETWORKS FOR SPEECH ENHANCEMENT

CROSS-REFERENCE TO RELATED APPLICATIONS

This application claims the benefit of priority to U.S. Provisional Application No. 63/017,155, filed on Apr. 29, 2020, and entitled "MIXED ADAPTIVE AND FIXED COEFFICIENT NEURAL NETWORKS FOR ON DEVICE REAL-TIME SPEECH ENHANCEMENT", the contents of which are incorporated herein in their entirety and for all purposes.

TECHNICAL FIELD

The present disclosure generally relates to processing audio inputs and, more particularly, to neural networks for speech enhancement.

BACKGROUND

Many devices include audio capabilities that allow the devices to receive and/or record audio from one or more sources in an environment. For example, a user device can include microphone capable of receiving an audio input from a source, and a speaker capable of outputting audio provided to the speaker. In many cases, an audio input can be noisy and often includes echo. Speech processing can be used to improve the quality of the audio input and generate output data. The output data can be sent to one or more components of the user device for further processing. For instance, a microprocessor of the user device can provide the output data to a speaker of the user device and/or send the output data to another device such as, for example, a server or another user device. However, despite some improvements in the quality of the audio, the audio still often includes a certain amount of noise and echo that negatively impact the quality of the audio.

SUMMARY

In some examples, systems and techniques are described for mixed adaptive and fixed coefficient neural networks for speech enhancement. According to at least one illustrative example, a method for real-time speech enhancement using a mixed adaptive and fixed coefficient neural network is provided. In some examples, the method can include receiving, by a first neural network portion of a hybrid neural network system, an input comprising audio data and reference data, the audio data comprising speech data, noise data, and echo data; filtering, by the first neural network portion, a portion of the audio data based on adapted coefficients of the first neural network portion, the portion of the audio data comprising at least one of the noise data and/or the echo data, the adapted coefficients comprising coefficients adjusted based on the input and/or an output of the first neural network portion; generating, by the first neural network portion based on the filtering of the portion of the audio data, filtered audio data comprising the speech data and an unfiltered portion of at least one of the noise data and/or the echo data; and extracting, by a second neural network portion of the hybrid neural network system based on the filtered audio data and the reference data, the speech data from the filtered audio data.

According to at least one illustrative example, a non-transitory computer-readable medium for real-time speech enhancement using a mixed adaptive and fixed coefficient neural network is provided. In some aspects, the non-transitory computer-readable medium can include instructions that, when executed by one or more processors, cause the one or more processors to receive, by a first neural network portion of a hybrid neural network system, an input comprising audio data and reference data, the audio data comprising speech data, noise data, and echo data; filter, by the first neural network portion, a portion of the audio data based on adapted coefficients of the first neural network portion, the portion of the audio data comprising at least one of the noise data and/or the echo data, the adapted coefficients comprising coefficients adjusted based on the input and/or an output of the first neural network portion; generate, by the first neural network portion based on the filtering of the portion of the audio data, filtered audio data comprising the speech data and an unfiltered portion of at least one of the noise data and/or the echo data; and extract, by a second neural network portion of the hybrid neural network system based on the filtered audio data and the reference data, the speech data from the filtered audio data.

According to at least one illustrative example, an apparatus for real-time speech enhancement using a mixed adaptive and fixed coefficient neural network is provided. In some aspects, the apparatus can include memory having stored thereon computer-readable instructions and one or more processors configured to receive, by a first neural network portion of a hybrid neural network system, an input comprising audio data and reference data, the audio data comprising speech data, noise data, and echo data; filter, by the first neural network portion, a portion of the audio data based on adapted coefficients of the first neural network portion, the portion of the audio data comprising at least one of the noise data and/or the echo data, the adapted coefficients comprising coefficients adjusted based on the input and/or an output of the first neural network portion; generate, by the first neural network portion based on the filtering of the portion of the audio data, filtered audio data comprising the speech data and an unfiltered portion of at least one of the noise data and/or the echo data; and extract, by a second neural network portion of the hybrid neural network system based on the filtered audio data and the reference data, the speech data from the filtered audio data.

According to another illustrative example, an apparatus for real-time speech enhancement using a mixed adaptive and fixed coefficient neural network can include means for receiving, by a first neural network portion of a hybrid neural network system, an input comprising audio data and reference data, the audio data comprising speech data, noise data, and echo data; filtering, by the first neural network portion, a portion of the audio data based on adapted coefficients of the first neural network portion, the portion of the audio data comprising at least one of the noise data and/or the echo data, the adapted coefficients comprising coefficients adjusted based on the input and/or an output of the first neural network portion; generating, by the first neural network portion based on the filtering of the portion of the audio data, filtered audio data comprising the speech data and an unfiltered portion of at least one of the noise data and/or the echo data; and extracting, by a second neural network portion of the hybrid neural network system based on the filtered audio data and the reference data, the speech data from the filtered audio data.

In some aspects, the method, non-transitory computer-readable medium, and apparatuses described above can include filtering, based on the extracted speech data, an additional portion of at least one of the noise data and/or the echo data. In some examples, filtering the additional portion of at least one of the noise data and/or the echo data can include providing, by the second neural network portion to the first neural network portion, feedback comprising the extracted speech data.

In some cases, filtering the additional portion of at least one of the noise data and/or the echo data can include providing the extracted speech data and the input to a third neural network portion of the hybrid neural network system; filtering, by the third neural network portion based on additional adapted coefficients of the third neural network portion, a different portion of at least one of the noise data and/or echo data; and generating, by the third neural network portion, different filtered audio data comprising the speech data.

In some aspects, the method, non-transitory computer-readable medium, and apparatuses described above can include providing, to a fourth neural network portion of the hybrid neural network system, the different filtered audio data and the reference data; and outputting, by the fourth neural network portion, different extracted speech data based on the different filtered audio data and the reference data.

In some examples, the echo data can include non-linear echo data and linear echo data. In some cases, the portion filtered by the first neural network portion can include the linear echo data.

In some examples, the reference data can include far end echo data. In some cases, the adapted coefficients of the first neural network portion are linear coefficients that are adapted based on an approximation of the linear echo data. In some examples, the approximation of the linear echo data can be based on the far end echo data.

In some cases, the unfiltered portion of at least one of the noise data and/or the echo data can include the non-linear echo data. In some cases, the filtered audio data can include the speech data, the noise data and the non-linear echo data.

In some examples, the first neural network portion can include an adaptive neural network portion, and the second neural network portion can include a fixed coefficient neural network portion.

In some examples, the first neural network portion can receive the audio data and adjusts the coefficients in real time to generate the adapted coefficients.

In some cases, filtering the portion of the audio data can include iteratively approximating the adapted coefficients. In some examples, a first iteration implements initial coefficient values for the coefficients, and the adapted coefficients are generated at one or more additional iterations.

In some aspects, the method, non-transitory computer-readable medium, and apparatuses described above can include receiving second audio data; and re-approximating, by the first neural network portion based on the second audio data, the adapted coefficients. In some examples, the re-approximating can start with the adapted coefficients as the initial coefficient values.

In some aspects, the method, non-transitory computer-readable medium, and apparatuses described above can include receiving second audio data; and generating, by the first neural network portion based on the second audio data, second filtered audio data based on the adapted coefficients.

In some aspects, an apparatus can be, or can be part of, a camera (e.g., an IP camera), a mobile device (e.g., a mobile telephone or so-called "smartphone," or other mobile device), a smart wearable device, an audio device, an extended reality device (e.g., a virtual reality (VR) device, an augmented reality (AR) device, or a mixed reality (MR) device), a personal computer, a laptop computer, a server computer, an audio recording system, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 5 is a flowchart illustrating an example process for extracting speech data from audio data using a hybrid neural network, in accordance with some examples of the present disclosure.

DETAILED DESCRIPTION

Figure 1:
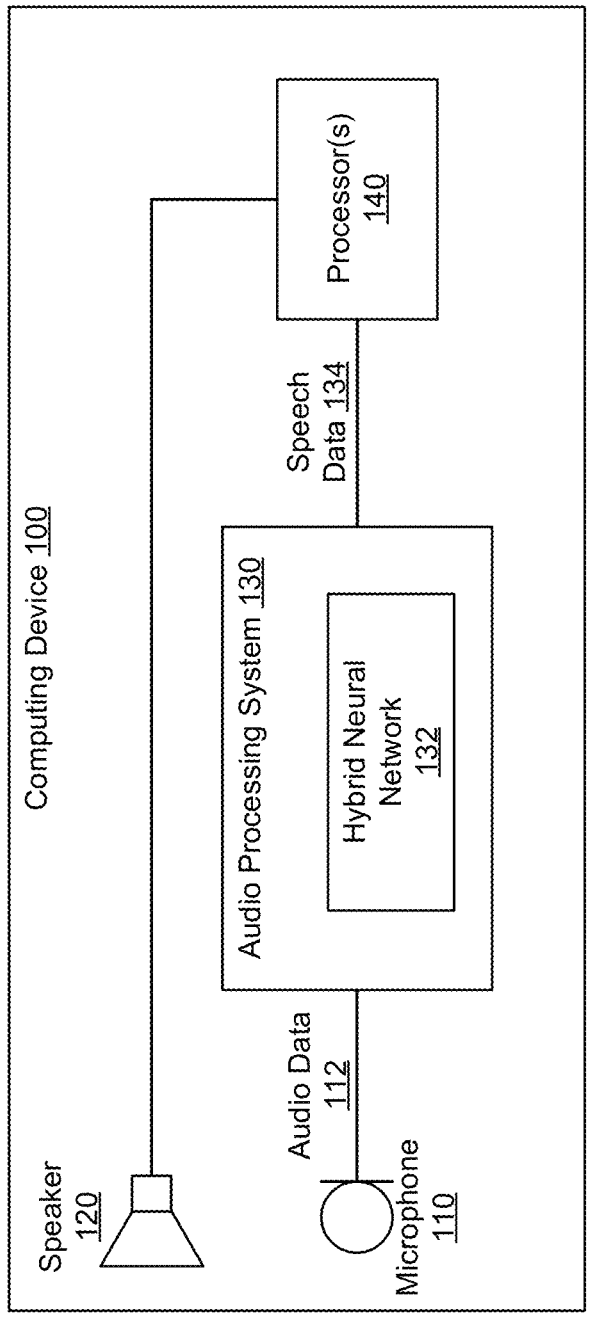
FIG. 1 is a diagram illustrating an example computing device implementing a hybrid neural network for audio processing, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

In some aspects, systems, apparatuses, processes (also referred to as methods), and computer-readable media (collectively referred to herein as "systems and techniques") are described herein that provide a hybrid neural network (including adaptive and fixed coefficient neural network portions) for speech enhancement. In some cases, neural networks such as speech generative networks and masking neural networks can extract cleaner speech from noisy speech mixtures, such as speech signals including an audio/speech signal(s) mixed with one or more noise and/or echo signals. The neural networks can use coefficients that are fixed for a target (e.g., a user device, etc.) following a training procedure. However, the training procedure often does not anticipate or include certain noisy mixtures to which the target can be subjected, which can negatively impact the performance of the neural networks. For example, a neural network may have difficulty and/or lower performance when extracting clean speech from noisy speech mixtures captured by a device implementing multiple microphones. As another example, the neural network may have difficulty and/or lower performance when performing echo cancellation frontend processing.

In some examples, as further described herein, implementing coefficients that can be adapted (rather than being fixed) to current and/or specific noisy mixtures can optimize the performance of a process for extracting cleaner speech from a noisy speech mixture. In some cases, the systems and techniques described herein can process audio data using a neural network that includes and/or combines an adaptive neural network structure/algorithm (e.g., a neural network portion that implements adaptive coefficients) and a fixed coefficient neural network structure/algorithm (e.g., a neural network portion that implements fixed coefficients).

In some examples, systems and techniques described herein can implement an audio processing system that supports echo cancellation and noise suppression (ECNS). The audio processing system can include a hybrid neural network that includes one or more adaptive neural network portions and one or more fixed coefficient neural network portions. In some examples, upon receiving an audio input that includes echo, noise, and reference data, an adaptive neural network portion of the audio processing system can adapt its coefficients to approximate at least a portion of echo and/or noise based on the reference data and remove at least the portion of echo and/or noise from the audio input. The adaptive neural network portion can generate a filtered audio input (e.g., the original audio input excluding the approximated portion of the echo and/or noise). The filtered audio input can be provided to a fixed coefficient neural network portion of the audio processing system for further processing. In some cases, the fixed coefficient neural network portion can be pre-trained to extract speech. The pre-training can be performed offline (e.g., prior to an inference/deployment stage) and can generate fixed coefficients for the fixed coefficient neural network portion. The fixed coefficient neural network portion can process the filtered audio input and output speech from the filtered audio input.

In some examples, the systems and techniques described herein can include an end-to-end neural network approach for ECNS. In some cases, audio input includes speech data, noise data, linear echo data, and non-linear echo data. Reference data can include far end echo reference data. In a first lower network stage, an adaptive neural network portion can remove the linear echo data. The adaptive neural network portion can adapt neural network coefficients based on the far end echo reference data. In some examples, the adaptive neural network portion can implement independent component analysis (ICA), principal component analysis (PCA), and/or any blind source separation (BSS) learning rules. In a second upper network stage, a neural network portion with fixed coefficients that are trained offline can receive the noisy speech with nonlinear echo residuals as input. The neural network portion can extract and output clean speech from the noisy speech. A hybrid neural network with such a structure of mixed adaptive and fixed coefficient portions or stages can implement a neural network framework where neural network coefficients can be adapted on demand (e.g., in real time or significantly real time during inference or deployment of the neural network), while other neural network coefficients remain fixed. The hybrid neural network with the mixed adaptive and fixed coefficient structure can enable on-device learning to match current noisy mixtures of the target.

For clarity and explanation purposes, various examples are described herein in connection with filtering out linear echo data by an adaptive neural network portion of a hybrid neural network. However, the systems and techniques described herein are not limited as such and can be implemented for other types of filtering. For instance, additionally or alternatively to filtering out linear echo data, noise data and/or non-linear echo data can be removed. In an illustrative example, noise data can be filtered out by an adaptive neural network portion of the hybrid neural network that approximates the noise data based on reference data. The approximation can tune the coefficients of the adaptive neural network portion on demand. In another illustrative example, non-linear echo data can be filtered out by an adaptive neural network portion that approximates the non-linear data based on reference data. The approximation can also tune the coefficients of the adaptive neural network portion on demand. The outputs of the adaptive neural network portion(s) can be input to a fixed coefficient neural network portion of the hybrid neural network. The fixed coefficient neural network portion can be pre-trained to output speech data. The pre-training can use training data of the same type as the outputs. For example, if an output excludes noise data, the fixed coefficient neural network portion can be trained to extract speech from training audio data that also excludes noise data.

Various aspects of the techniques described herein will be discussed below with respect to the figures. According to various aspects, FIG. 1 illustrates an example computing device 100 implementing a hybrid neural network 132 for audio processing, in accordance with some examples of the disclosure. The computing device 100 can include one or more user input interfaces, such as a microphone 110, one or more user output interfaces, such as a speaker 120, an audio processing system 130, and a processor(s) 140, among other components.

The microphone 110 receives audio input, including speech of a user(s), and generates audio data 112. The microphone 110 can send the audio data 112 to the audio processing system 130. The audio processing system 130 can extract speech data 134 from the audio data 112. The speech data 134 can correspond to the speech of the user(s). The audio processing system 130 can provide the speech data 134 to the processor(s) 140. The processor(s) 140, depending on a hardware configuration and/or software configuration, can process the speech data 134 to, for instance, provide the processed data to the speaker 120 for output, send the processed data to one or more other devices, store the processed data, receive other audio data from one or more other devices and provide the other audio data to the speaker 120 for output, etc.

The computing device 100 can be part of a computing device or multiple computing devices. In some examples, the computing device 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an extended reality device (e.g., a head-mounted display, smart glasses, etc.), a smart wearable device (e.g., a smart watch, smart glasses, etc.), a laptop or notebook computer, a tablet computer, a set-top box, a television, a display device, a digital media player, a gaming console, a video streaming device, a computer in a car, a system-on-chip (SoC), an Internet-of-Things (IoT) device, an audio system, or any other suitable electronic device(s).

In some examples, the computing device 100 can include a mobile device, a tablet computer, a laptop computer, a desktop computer, a smart speaker, an IoT device, a television, a camera system, or another type of electronic device. For illustration and explanation purposes, FIG. 1 illustrates the audio data 112 being received by the audio processing system 130 from the microphone 110. However, in other examples, the audio data 112 can be received (and processed) by audio processing system 130 from another source. For instance, audio processing system 130 and/or the processor(s) 140 can receive the audio data 112 from another electronic device, which can be separate from or implemented by the computing device 100. In example implementations where the audio data 112 is received from another source, the computing device 100 may or may not include the microphone 110.

In some examples, the audio processing system 130 can process the audio data 112 in real time (or near real time) to output the speech data 134. The speech data 114 can be output in real time or can be stored in memory for a subsequent non-real time retrieval. In some examples, when processing the audio data 112 in "real time", the audio processing system 130 can adapt coefficients of an adaptive neural network portion of the hybrid neural network 132 on demand (on the fly) as the audio data 112 is received and processed, as further explained herein.

In some cases, the audio processing system 130 can be implemented by hardware designed and/or dedicated for audio processing and/or software for audio processing implemented on hardware that is designed and/or dedicated for audio processing. In some examples, the audio processing system 130 can include, among other components, a hybrid neural network 132, one or more digital signal processors (DSPs), audio codecs, digital-to-analog converters (DACs), analog-to-digital converters (ADCs), filters, power amplifiers, attenuators, audio and/or voice software, neural processing units (NPUs), application-specific integrated circuits (ASICs), microprocessors, etc. For instance, the audio processing system 130 can be implemented as an audio processor chip on the computing device 100. In some cases, some or all of the components of the audio processing system 130 can include one or more components of the Qualcomm Aqstic® chip, available from QUALCOMM, a corporation headquarter in San Diego, Calif.

In some examples, the hybrid neural network 132 can be implemented by designed and/or dedicated hardware, software executing on hardware, and/or a combination of software and hardware. In some cases, one or more portions of the hybrid neural network 132 can be implemented in software and one or more portions of the hybrid neural network 132 can be implemented in hardware. For example, in some cases, an adaptive neural network portion of the hybrid neural network 132 can be implemented as software program code, and a fixed coefficient neural network portion of the hybrid neural network 132 can be implemented as hardware.

In some examples, as noted above, the hybrid neural network 132 can include one or more adaptive neural network portions that implement adaptive coefficients, and one or more fixed coefficient neural network portions that has fixed coefficients. For example, the hybrid neural network 132 can include an adaptive neural network portion that is coupled with (e.g., in communication with) a fixed coefficient neural network portion to form the hybrid neural network 132. The adaptive neural network portion can adapt its coefficients on demand (e.g., in real time) during a deployment/inference stage (e.g., when processing audio data). The adaptive neural network portion can use the adapted coefficients to remove one or more components from audio data, such as a linear echo component. The fixed coefficient neural network portion can implement fixed coefficients, and can use the fixed coefficients to extract speech from the audio data. In some examples, the fixed coefficient neural network portion can remove a noise and/or non-linear echo component from the audio data to extract the speech from the audio data.

The hybrid neural network 132 can output a signal including the extracted speech. The output signal can have a significantly improved signal-to-noise and/or signal-to-echo ratio, and can provide higher quality speech data. For example, noise and/or echo in audio data containing speech data can negatively impact the quality of the audio data and the clarity/quality of the speech data in the audio data. By removing the noise, linear echo data, and/or non-linear echo data from audio data as described herein, the hybrid neural network 132 can significantly improve the quality of the audio data and the speech data in the audio data.

In some cases, the hybrid neural network 132 can decorrelate components in an acoustic signal to subtract noise and/or echo from the acoustic signal. In some examples, the hybrid neural network 132 can identify a linear relationship between a linear echo component in a signal and reference echo data, and use the linear relationship to determine how to subtract (e.g., via the adaptive neural network portion) the linear echo component from the signal.

In some cases, the adaptive neural network portion and the fixed coefficient neural network portion can form one or more audio processing stages. In some cases, at each audio processing stage, the hybrid neural network 132 can receive the audio data 112 and reference data as input, and output speech data associated with the audio processing stage. In some examples, when the audio processing stage is an only and/or a last audio processing stage, the output speech data can be the speech data 134.

Depending on the computing device 100 and/or the environment in which the computing device 100 is deployed, the audio data 112 can include near-end speech data, noise data, linear echo data, and/or non-linear echo data. In some examples, the near-end speech data corresponds to speech from a user associated with the computing device 100, detected by the microphone 110 (or another microphone of another electronic device). The noise data can correspond to ambient noise from the environment and/or other noise such as sensor noise of the microphone 110. The non-linear echo data and the linear echo data can form echo data generated by the microphone 110 based on far end audio data.

In some examples, the far end audio data can correspond to an acoustic signal(s), such as a far end audio/speech signal from another user and/or device, that is received and/or detected by the computing device 100 and/or output by the speaker 120. In some examples, the linear echo data can correspond to acoustic data generated along a linear path(s) of an audio waveform(s) (e.g., the far-end audio data upon presentation at the speaker 120). In some cases, the linear path can correspond to a path against which the audio waveform(s) bounced before being detected by the microphone 110 (e.g., corresponding to the room impulse response). Linear echo data can be cancelled by using linear filters. The non-linear echo data can correspond to non-linear echo generated by one or more components for the far-end audio data, such as the speaker 120 and/or a power amplifier connected to the speaker 120. For example, the non-linear echo data can correspond to any residual echo that may not be or is not subtracted through a linear echo canceller.

For example, in some cases, the near-end speech data can include speech from a near-end user in the near-end environment (e.g., speech from a user within a proximity to the computing device 100 and/or a microphone receiving the near-end speech data, such as microphone 110). To illustrate, the near-end speech data can include speech from a user talking to the microphone 110. Moreover, the near-end noise can include noise in the environment where the computing device 100 is located. A far end reference echo signal can include a far end echo signal received by the microphone 110 and played by the speaker 120. In this example, the linear echo data can include a signal recorded by the microphone 110 from/based on the far end echo signal. The signal associated with the linear echo data can be linearly related to the far end echo signal. The non-linear echo data can include a non-linear part of the far end echo signal that is recorded by the microphone 110 such as, for example and without limitation, a distortion in an audio signal playback, a non-linear clipping distortion, ringing and/or other sounds/vibrations, etc.

In some examples, an adaptive neural network portion of an audio processing stage of the hybrid neural network 132 can adapt and/or tune its coefficients (e.g., linear coefficients of the adaptive neural network portion and/or filters of the adaptive neural network portion) to approximate the linear echo data (or as indicated above, any other portion of the audio data 112 such as the noise data and/or non-linear echo data), filter out the linear echo data from the audio data 112 based on the adapted coefficients (or filter out other portion(s) of the audio data 112, as applicable), and output the filtered audio data (e.g., the audio data 112 from which the linear echo data is subtracted (or from which the other portion(s) is removed, as applicable). In some examples, the adaptive neural network portion can implement independent component analysis (ICA) or principal component analysis (PCA).

In some examples, the adaptive neural network portion can adapt and/or tune its coefficients during a deployment/inference stage. For example, the adaptive neural network portion can adapt and/or tune its coefficients in real time (or near real time) when processing the audio data 112. In some cases, the adaptive neural network portion can implement learning rules for adapting and/or tuning the coefficients.

In some examples, to remove the linear echo data from echo data including linear and non-linear echo data, the adaptive neural network portion can subtract the far end reference echo signal from the echo data. As previously mentioned, the linear echo data can be linearly related to the far end reference echo signal. The adaptive neural network portion can leverage this relationship between the linear echo data and the far end reference echo signal to remove the linear echo data from the echo data.

The filtered output data from the adaptive neural network portion can be input to a fixed coefficient neural network portion of the audio processing stage of the hybrid neural network 132. In some cases, the fixed coefficient neural network portion can be pre-trained to have fixed coefficients. Based on the fixed coefficients, the fixed coefficient neural network portion can output speech data (e.g., the near-end speech data) by removing the other audio data portions from the filtered audio data. In some examples, the fixed coefficient neural network portion can include a speech generative network. In other examples, the fixed coefficient neural network portion can include a masking prediction neural network or another neural network structure and/or blind source separation algorithm.

In some examples, signals including a speech component, a noise component, a linear echo component, a non-linear echo component, and a reference echo component can be processed by a source separation stage of the hybrid neural network 132 that removes the linear echo component from the signals. By removing the linear echo component, the source separation stage can significantly improve the signal-to-noise and/or signal-to-echo ratio of the signals. The hybrid neural network 132 can also remove the noise and/or non-linear component from the signals and extract the speech component to generate clean or cleaner speech (e.g., to improve a quality of a signal including the speech component).

In some aspects, the computing device 100 can include means for performing operations described herein. The means can include one or more of the components of the computing device 100 and/or the computing device architecture 600 shown in FIG. 6. For example, the means for performing operations described herein may include one or more microphones (e.g., microphone 110), one or more speakers (e.g., speaker 120), one or more audio processing systems (e.g., audio processing system 130), one or more hybrid neural networks (e.g., hybrid neural network 132), and/or one or more processors (e.g., processor(s) 140).

In some aspects, the computing device 100 can include means for receiving an input including audio data and reference data, the audio data including speech data, noise data, and echo data; means for filtering a portion of the audio data based on adapted coefficients of a first neural network portion, the portion of the audio data including at least a portion of the noise data and/or the echo data, the adapted coefficients including coefficients adjusted based on the input; means for generating, based on the filtering of the portion of the audio data, filtered audio data including the speech data and an unfiltered portion of at least one of the noise data and the echo data; and means for extracting, based on the filtered audio data and the reference data, the speech data from the filtered audio data.

In some examples, the means for receiving the input can include the hybrid neural network 132, a processor (e.g., processor(s) 140), and/or one or more communication interfaces (e.g., wireless and/or wired communication interfaces). In some examples, the means for filtering the portion of the audio data and generating the filtered audio data can include the audio processing system 130, an adaptive neural network portion of the hybrid neural network 132, the processor(s) 140, and/or any components of the computing device 100. In some examples, the means for extracting the speech data from the filtered audio data can include the audio processing system 130, a fixed coefficient neural network portion of the hybrid neural network 132, the processor(s) 140, and/or any components of the computing device 100.

Figure 2A:
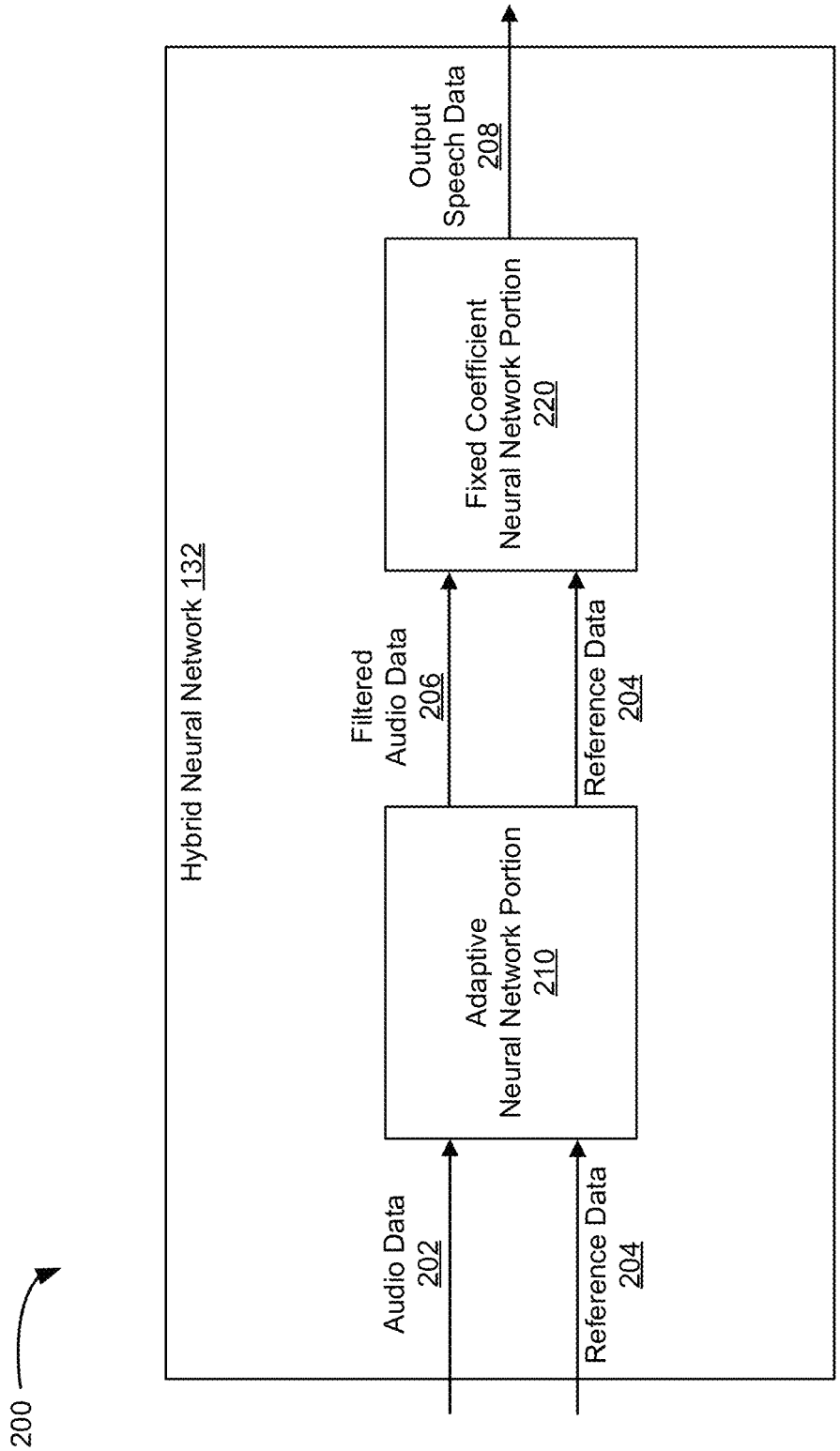
FIG. 2A is a diagram illustrating an example of an audio processing stage of a hybrid neural network including an adaptive neural network portion and a fixed coefficient neural network portion that are coupled for audio processing, in accordance with some examples of the present disclosure.

FIG. 2A is a diagram illustrating an example audio processing stage 200 of hybrid neural network 132. As shown in this example, the hybrid neural network 132 can include an adaptive neural network portion 210 and a fixed coefficient neural network portion 220. The adaptive neural network portion 210 and the fixed coefficient neural network portion 220 can form the audio processing stage 200 of the hybrid neural network 132. In some examples, the audio processing stage 200 can be the only stage of the hybrid neural network 132. In other examples, the audio processing stage 200 can be one of several audio processing stages implemented by the hybrid neural network 132.

Figure 2B:
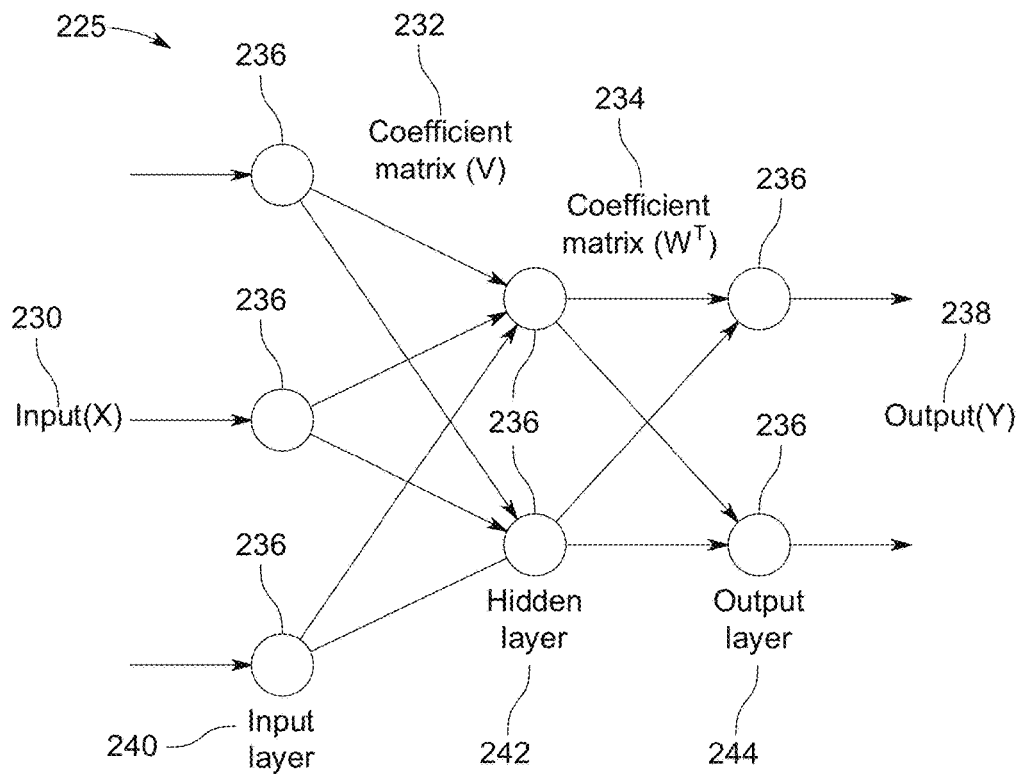
FIG. 2B is a diagram illustrating an example source separation structure that can be implemented by an adaptive neural network portion of a hybrid neural network, in accordance with some examples of the present disclosure.

In some examples, the adaptive neural network portion 210 can be implemented as linear neural network with a number of layers such as, for example, a multi-layer feedforward network as shown in FIG. 2B. In some cases, the adaptive neural network portion 210 can implement a blind source separation (BSS) algorithm. A BSS algorithm can separate source signals from their linear mixtures. For example, the adaptive neural network portion 210 can implement a BSS algorithm to remove linear echo/noise data from input audio data 202 including a noisy and/or echo mixture. In some cases, the adaptive neural network portion 210 can implement a PCA or ICA model, as previously explained.

In FIG. 2A, the adaptive neural network portion 210 can receive audio data 202 and reference data 204 as inputs. The audio data 202 can include speech data, noise data, linear echo data, and non-linear echo data. The reference data 204 can include, for example, far end echo reference data associated with a far end echo reference signal. In some cases, the audio data 202 can be the same as the audio data 112 shown in FIG. 1.

The adaptive neural network portion 210 can process the audio data 202 and the reference data 204 to remove the linear echo data from the audio data 202. The linear echo data can be linearly related to the reference data 204. Accordingly, in some examples, to remove the linear echo data, the adaptive neural network portion 210 can subtract the reference data 204 from the audio data 202 (e.g., resulting in subtraction of the far end reference echo signal from the echo data, as noted above). The subtracted reference data can result in filtered audio data 206, which can include the audio data 202 without the linear echo data. The adaptive neural network portion 210 can output the filtered audio data 206 and, optionally, the reference data 204. The filtered audio data 206 can include the speech data, noise data, and non-linear echo data from the audio data 202.

In the filtered audio data 206, the adaptive neural network portion 210 can remove the linear echo data from the audio data 202 based on adaptive coefficients that the adaptive neural network portion 210 can adapt/tune when processing the audio data 202 and the reference data 204. In some examples, the adaptive coefficients can include linear coefficients of the adaptive neural network portion 210. In some cases, the linear coefficients can include and/or represent linear filters that filter out (e.g., remove completely or remove a best approximated portion of) the linear echo data from the audio data 202.

In some cases, the adaptive neural network portion 210 can implement time-varying coefficients. For example, the adaptive neural network portion 210 can implement coefficients that are adapted (e.g., tuned, adjusted, tailored, etc.) during a deployment of the adaptive neural network portion 210 (e.g., at an inference stage when processing audio data). The adaptive neural network portion 210 can implement adaptation rules for adapting its coefficients on demand (e.g., in real time).

In some examples, the adaptive neural network portion 210 can approximate the linear echo data by adapting its coefficients (e.g., linear coefficients) given the reference data 204. The linear echo data can be linearly related to the reference data 204. The adaptive neural network portion 210 can use the adapted coefficients to remove the linear echo data from the audio data 202. As previously noted, the approximation can be based on a BSS algorithm. In some cases, the approximation can be based on an ICA or PCA model implemented by the adaptive neural network portion 210.

In some examples, an ICA model can represent data vectors in a linear basis. The linear basis can be determined using coefficients of expansions that are mutually independent (or significantly mutually independent) or as independent as possible. Therefore, the data vectors can be non-orthogonal. The adaptive neural network portion 210 can be configured to derive the linear basis and represent the data vectors. The adaptive neural network portion 210 can include a number of inputs, such as a number of inputs with the number corresponding to a component of a vector. In some cases, the adaptive neural network portion 210 can include one or more input layers, one or more hidden layers, and one or more output layers. In some examples, a hidden layer can include "M" neurons, and the output layer can include "L" neurons.

In some examples, the adaptive neural network portion 210 can form "M×L" coefficient matrices. A first coefficient matrix can include an "M×L" coefficient matrix between the inputs and the hidden layer. A second coefficient matrix can include an "M×L" coefficient matrix between the hidden layer and the output layer. A data model, such as an ICA expansion, can be estimated in one or more stages. In some examples, the adaptive neural network portion 210 can first learn an "M×L" coefficient matrix for which the components of a vector represented by the hidden layer are as independent as possible. The adaptive neural network portion 210 can then learn another "M×L" coefficient matrix that minimizes the mean-square error with respect to approximated data (e.g., the approximated linear echo data, and the mean-square error relative to the reference data 204).

In some cases, the adaptive neural network portion 210 can model BSS rules. For example, a first stage of the adaptive neural network portion 210 can be divided into subsequent parts. In a first part, the input vectors can be whitened according to an "M×L" transformation matrix to generate a whitened vector. A second part can follow the first part, and can separate the whitened vectors into independent components according to an "M×M" separation matrix. In some cases, rather than learning the first "M×L" coefficient matrix, the M×L" transformation matrix and the "M×M" separation matrix can be learned in the initial stage, and the second "M×L" coefficient matrix can be learned in a subsequent stage. During the learning, feedback connections can exist between the layers to fine tune the coefficients of the different matrix. The learning and feedback can use real-time data (e.g., the audio data 202 and the reference data 204). Examples of multi-layer feedforward networks that can be adapted for the adaptive neural network portion 210 in light of the present disclosure to filter out linear echo data, are described in the paper entitled "Neural Approaches to Independent Component Analysis and Source Separation," to Juha Karhunen at the Helsinki University of Technology, Laboratory of Computer and Information Science. The contents of the paper are incorporated herein by reference in their entirety.

Once the coefficients are learned, the adaptive neural network portion 210 can store the coefficients in memory/storage for use in processing additional input data that is subsequently received. In some examples, the adaptive neural network portion 210 can continuously learn the coefficients. The adaptive neural network portion 210 can store the continuously learned coefficients in memory or, at time intervals, refresh the coefficients by performing another approximation. In some cases, once the coefficients are learned, gating circuitry can be implemented to select and update logic that combines preset coefficients to produce the learned coefficients. The selection and update can occur once, continuously, or at time intervals.

The fixed coefficient neural network portion 220 can receive the filtered audio data 206 (e.g., speech data, noise data, and non-linear echo data) output by the adaptive neural network portion 210 as an input to the fixed coefficient neural network portion 220. The fixed coefficient neural network portion 220 can also receive the reference data 204 as another input to the fixed coefficient neural network portion 220. The fixed coefficient neural network portion 220 can use the reference data 204 to remove the noise data and/or non-linear echo data from the filtered audio data 206 and generate output speech data 208. In some examples, the output speech data 208 can include speech data without the noise data, the linear echo data, and/or the non-linear echo data in the audio data 202. For example, the speech data 208 can include a speech component extracted from the audio data 202. In some cases, the speech data 208 can be the same as the speech data 134 shown in FIG. 1.

In some examples, the fixed coefficient neural network portion 220 can be pre-trained to approximate, given the reference data (e.g., reference data 204), the speech data from the input data (e.g., from the filtered audio data 206). In some cases, the fixed coefficient neural network portion 220 can be pre-trained offline using a set of training data. In some examples, the type(s) of training data used to train the fixed coefficient neural network portion 220 can correspond to the type(s) of data that are output from the adaptive neural network portion 210 (e.g., the filtered audio data 206). For instance, the training data input to the fixed coefficient neural network portion 220 can include training speech data, training noise data, and training non-linear echo data. In some examples, training noise data and training non-linear echo data can be used as inputs to the fixed coefficient neural network portion 220 during offline training. The fixed coefficient neural network portion 220 can learn its coefficients (including non-linear coefficients corresponding to non-linear convolutional layers) based on the training input and training reference data. In some examples, during and/or through the learning, the fixed coefficient neural network portion 220 can tune the coefficients through back-propagation.

Figure 2C:
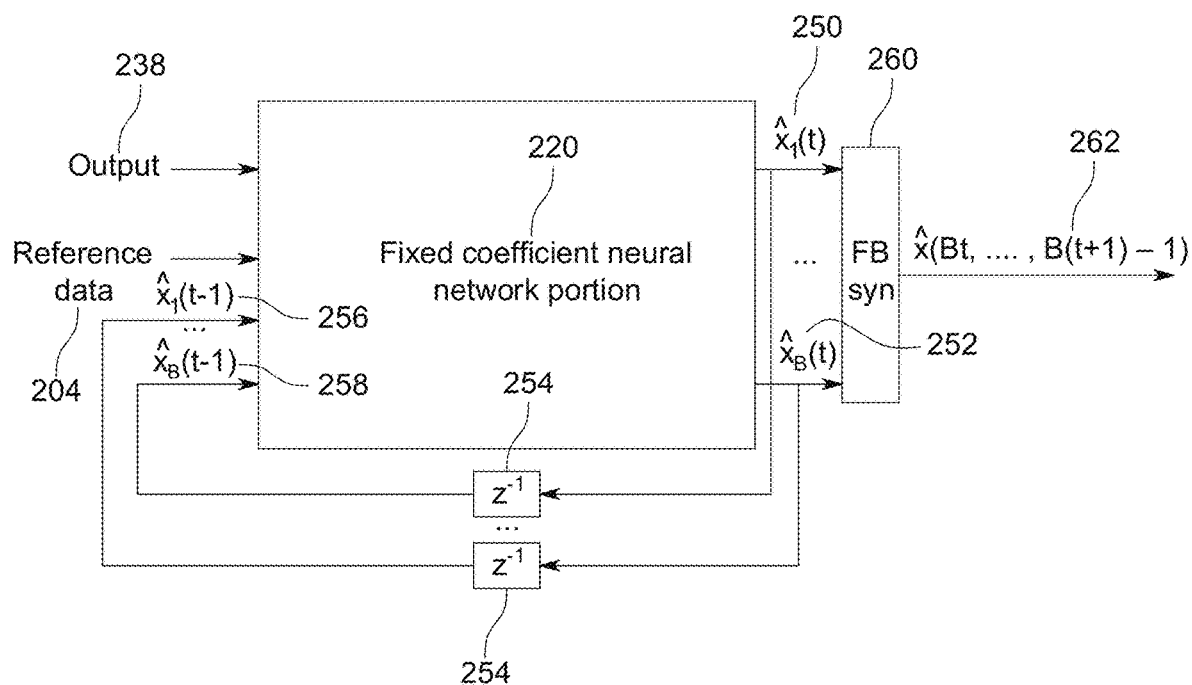
FIG. 2C is a diagram illustrating an example speech generative neural network that can be implemented by a fixed coefficient neural network portion, in accordance with some examples of the present disclosure.

In some cases, the fixed coefficient neural network portion 220 can include a speech generative neural network, as shown in FIG. 2C. In other cases, the fixed coefficient neural network portion 220 can include a different type of neural network such as, for example, a masking predictive neural network.

FIG. 2B is a diagram illustrating an example source separation structure 225 that can be implemented by the adaptive neural network portion 210 of the hybrid neural network 132. In this example, the source separation structure 225 can include a multi-layer feedforward neural network. The source separation structure 225 can include an input layer 240, a hidden layer 242, and an output layer 244. In other examples, the source separation structure 225 can include additional layers, such as one or more additional hidden layers.

The input layer 240, the hidden layer 242, and the output layer 244 can each include a number of neurons 236. For example, in some cases, the hidden layer 242 can include "M" number of neurons 236, and the output layer 244 can include "L" number of neurons 236. In other examples, the source separation structure 225 can include more or less neurons and/or components than shown in FIG. 2B.

The input layer 240 can process an input 230, which can include speech data. In some examples, the input 230 can include a data vector input including, representing and/or corresponding to audio data 202 and reference data 204. A number of inputs to the source separation structure 225 can correspond to the components of the data vector input (e.g., input 230). In some examples, the adaptive neural network portion 210 can form coefficient matrices 232 and 234. In some cases, the coefficient matrices 232 and/or 234 can include "M×L" coefficient matrices. For example, coefficient matrix 232 can include an "M×L" coefficient matrix between the input layer 240 and the hidden layer 242, and coefficient matrix 234 can include an "M×L" coefficient matrix between the hidden layer 242 and the output layer 244.

In some examples, the source separation structure 225 can first learn coefficient matrix 232, for which the components of a vector represented by the hidden layer 242 are independent. In some cases, the coefficient matrix 232 can include a separating weight matrix. The source separation structure 225 can then learn coefficient matrix 234, which can minimize the mean-square error with respect to approximated data (e.g., the approximated linear echo data, and the mean-square error relative to the reference data 204).

In some cases, a stage of the source separation structure 225 can be divided into parts. In a first part, the input vectors can be whitened according to an "M×L" transformation matrix (e.g., coefficient matrix 232) to generate whitened vectors. A second part can separate the whitened vectors into independent components according to an "M×M" separation matrix (e.g., coefficient matrix 234). In some cases, rather than learning the first "M×L" coefficient matrix in the initial stage, the M×L" transformation matrix and the "M×M" separation matrix can be learned in the initial stage, and a second "M×L" coefficient matrix can be learned in a subsequent stage.

During the learning, feedback connections can exist between the layers to fine tune the coefficients of the matrices. The learning and feedback can use real-time data (e.g., the audio data 202 and the reference data 204). Once the coefficients are learned, the source separation structure 225 can store the coefficients in memory/storage for use in processing additional input data. In some examples, the source separation structure 225 can continuously learn the coefficients, as previously explained.

At the output layer 244, the source separation structure 225 can use the coefficient matrix 234 to generate an output 238. The output 238 can include filtered audio data (e.g., filtered audio data 206) with a linear echo/noise component removed as previously explained. In some examples, the output 238 can include speech data, noise data, and non-linear echo/noise data. The output 238 can be fed into the fixed coefficient neural network portion 220 for processing. The inputs to the fixed coefficient neural network portion 220 can include the output 238 and reference data 204. Alternatively, if the output 238 includes the reference data 204 (e.g., in addition to the speech, noise, and non-linear data), the input to the fixed coefficient neural network portion 220 can be the output 238 from the source separation structure 225.

As previously mentioned, in some examples, the fixed coefficient neural network portion 220 can include a speech generative neural network. In other examples, the fixed coefficient neural network portion 220 can include other types of neural networks such as, for example, a masking predictive neural network.

FIG. 2C is a diagram illustrating an example speech generative neural network that can be implemented by the fixed coefficient neural network portion 220. In this example, the fixed coefficient neural network portion 220 implements the speech generative neural network to generate output speech 262 based on the reference data 204 and the output 238 (e.g., the filtered audio data 206) from the adaptive neural network portion 210 (e.g., from the source separation structure 225).

In some examples, the output 238 (e.g., the filtered audio data 206) and the reference data 204 can be buffered and provided as input to the fixed coefficient neural network portion 220 along with estimations of the fixed coefficient neural network portion 220 of the speech given the output 238 and the reference data 204. The output speech 262 from the fixed coefficient neural network portion 220 can include speech data without the noise data, the linear echo data, and the non-linear echo data. For example, the output speech 262 can include an approximation of the speech data with the noise data and non-linear echo/noise data in the output 238 being removed (e.g., completely removed or at least partly removed).

The fixed coefficient neural network portion 220 can process the output 238 and the reference data 204 to generate signal components 250 through 252. In some examples, the signal components 250 through 252 can include sub-band components. In some cases, the fixed coefficient neural network portion 220 can back propagate samples 254 associated with the signal components 250 through 252, which the fixed coefficient neural network portion 220 can use to process signals 256 and 258 corresponding to a previous time step and generate signal components as previously noted.

A synthesis filter bank (FB) 260 can recombine and/or resynthesize the signal components 250 and 252 into an output signal that includes the output speech 262. In some examples, the output signal can include a sequence of signal components generated by the fixed coefficient neural network portion 220. The sequence of signal components can form the output speech 262.

Figure 3:
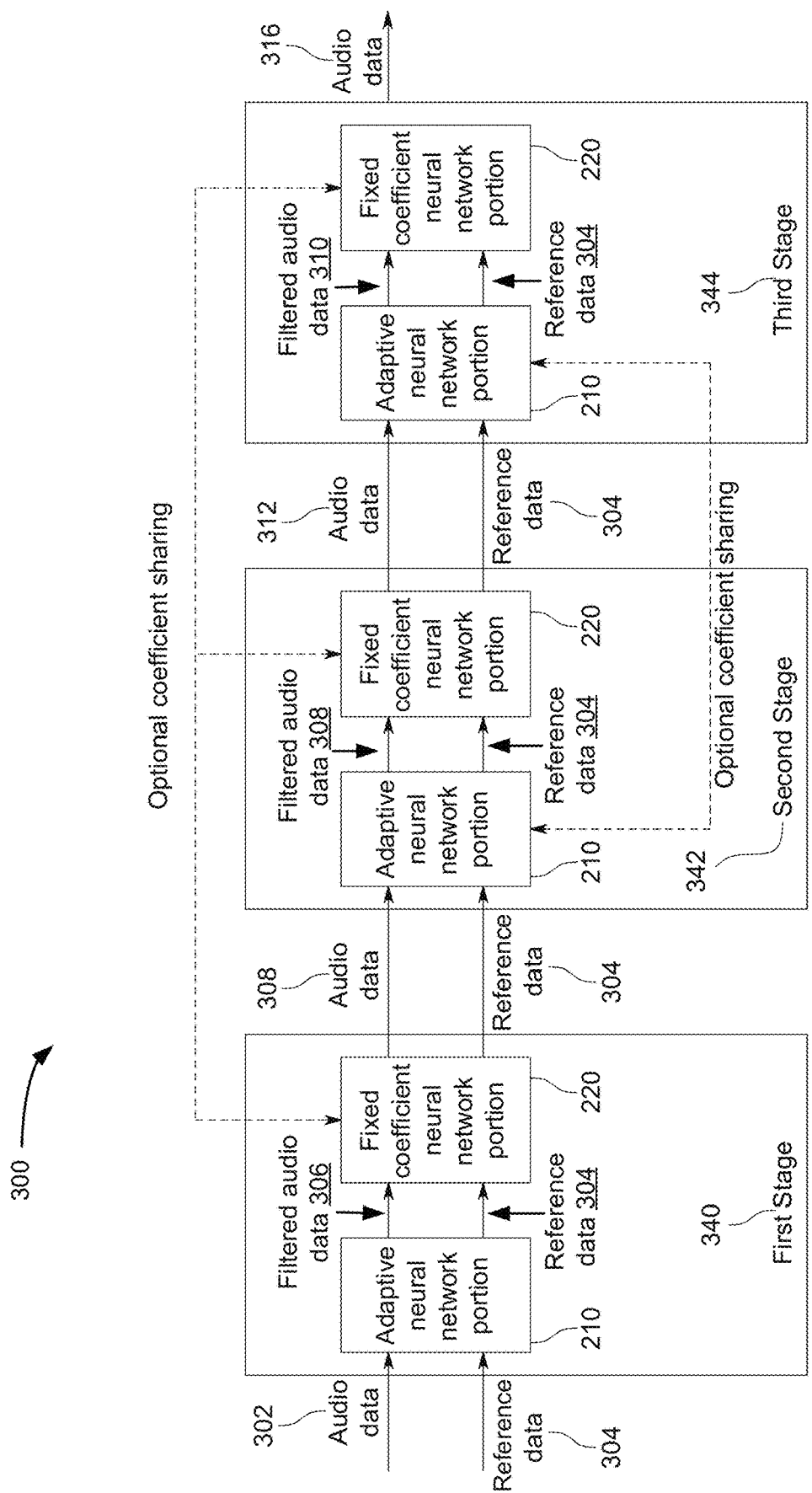
FIG. 3 is a diagram illustrating example cascaded audio processing stages implemented by a hybrid neural network that includes an adaptive neural network portion and a fixed coefficient neural network portion, in accordance with some examples of the present disclosure.

FIG. 3 is a diagram illustrating an example of cascaded audio processing stages 300 implemented by the hybrid neural network 132. Each of the cascaded audio processing stages 300 can include an adaptive neural network portion 210 and a fixed coefficient neural network portion 220. In this example, the cascaded audio processing stages 300 includes a first stage 340, a second stage 342, and a third stage 344. The number of stages shown in FIG. 3 is merely an illustrative example provided for explanation purposes. In other examples, the cascaded audio processing stages 300 can include more or less stages than shown in FIG. 3.

In some examples, each stage includes an adaptive neural network portion and a fixed coefficient neural network portion coupled to each other as illustrated in FIG. 2A. The fixed coefficient neural network portion 220 of one stage (except the last stage) can be coupled with the adaptive neural network portion 210 of the next stage. In some cases, the adaptive neural network portion 210 of the first stage 340 is only coupled with the fixed coefficient neural network portion 220 of that the first stage 340. At each stage, the adaptive neural network portion 210 outputs an approximation of speech data, noise data, and non-linear echo data to the fixed coefficient neural network portion 220 of the same stage, and the fixed coefficient neural network portion 220 of that stage approximates the speech data and provides the approximated speech data to the adaptive neural network portion 210 of the next stage, as applicable.

In some cases, the adaptive neural network portion 210 at each stage can be a different instance of an adaptive neural network portion. In other cases, the same adaptive neural network portion can be implemented at each of the stages. Similarly, in some cases, the fixed coefficient neural network portion 220 at each stage can be a different instance of a fixed coefficient neural network portion. In other cases, the same fixed coefficient neural network portion can be implemented at each of the stages.

In an illustrative example, the first stage 340 of the cascaded audio processing stages 300 includes an adaptive neural network portion 210 and a fixed coefficient neural network portion 220. The inputs to the adaptive neural network portion 210 in the first stage 340 can include a first input including audio data 302 and a second input including reference data 304. The audio data 302 can include speech data, noise data, linear echo data, and non-linear echo data. The reference data 304 can include reference echo/noise data as previously described with respect to reference data 204 shown in FIG. 2A.

The adaptive neural network portion 210 in the first stage 340 can adapt its coefficients and filter out (e.g., remove completely or remove a best approximation) the linear echo data in the audio data 302. The adaptive neural network portion 210 in the first stage 340 can output filtered audio data 306 including speech data, noise data, and non-linear echo data (and excluding some or all of the linear echo data). The fixed coefficient neural network portion 220 in the first stage 340 can extract the speech data (e.g., exact or best approximation) from the filtered audio data 306 and output audio data 308 including the extracted speech data for input to the second stage 342 of the cascaded audio processing stages 300.

The second stage 342 of the cascaded audio processing stages 300 includes an adaptive neural network portion 210 and a fixed coefficient neural network portion 220. The adaptive neural network portion 210 and the fixed coefficient neural network portion 220 in the second stage 342 can be the same as, or different instances of, the adaptive neural network portion 210 and the fixed coefficient neural network portion 220 in the first stage 340.

The adaptive neural network portion 210 in the first stage can receive the reference data 304, the audio data 302 (e.g., the speech data, noise data, linear echo data, and non-linear echo data), and the output audio data 308 from the first stage 340. As previously explained, the output audio data 308 can include the speech data extracted by the first stage 340. The model and/or source separating rules in the adaptive neural network portion 210 can allow the adaptive neural network portion 210 to process the third input shown in stage 342. The adaptive neural network portion 210 at the second stage 342 can adapt its coefficients and filter out the linear echo data in the audio data 302 and output filtered audio data 310 including speech data, noise data, and non-linear echo data. The fixed coefficient neural network portion 220 in the second stage 342 can extract the speech data (e.g., exact or best approximation) from the filtered audio data 310 and output audio data 312 including the extracted speech data. The output audio data 312 including the extracted speech data can then be processed by the third stage 344 of the cascaded audio processing stages 300.

The third stage 344 of the cascaded audio processing stages 300 can be implemented in the same or similar manner as the second stage 342. For example, the third stage 344 can include an adaptive neural network portion 210 and a fixed coefficient neural network portion 220.

The adaptive neural network portion 210 at the third stage 344 can adapt its coefficients and filter out the linear echo data in the audio data 302 and output filtered audio data 314 including speech data, noise data, and non-linear echo data. The fixed coefficient neural network portion 220 in the third stage 344 can extract the speech data (e.g., exact or best approximation) from the filtered audio data 314 and output audio data 316 including the extracted speech data. If the third stage 344 is the last stage of the cascaded audio processing stages 300, the output audio data 316 can be the output of the cascaded audio processing stages 300. If there are any additional stages in the cascaded audio processing stages 300, the third stage 344 can output the output audio data 316 to a subsequent stage of the cascaded audio processing stages 300.

In some examples, each of the fixed coefficient neural network portions of the cascaded audio processing stages 300 can be the same instance of a pre-trained fixed coefficient neural network portion. In some cases, in a software implementation, a hardware implementation, or a software-hardware distributed implementation, the coefficients of the pre-trained fixed coefficient neural network portion can be shared by the fixed coefficient neural network portions of the cascaded audio processing stages 300. This sharing can be accomplished by implementing the fixed coefficient neural network portions as a single fixed coefficient neural network portion that sequentially receives inputs from one of the adaptive neural network portions at a time and sequentially outputs the speech data to one of the adaptive neural network portions or to a processor(s) at the end. Additionally or alternatively, this sharing can be accomplished by implementing each of the fixed coefficient neural network portions as a separate network, and using the same coefficients in each of such networks.

As described herein, an adaptive neural network portion can learn its coefficients in real time (or near real time). In some cases, the adaptive neural network portion can store the learned coefficients (e.g., as values) for filtering out data such as, for example, linear echo data. In some examples, the coefficients associated with the adaptive neural network portion can be shared between stages. For example, the coefficients associated with the adaptive neural network portion can be sequentially spread from the first stage 340 to the second stage 342, from the second stage 342 to the third stage 344, and so forth. To illustrate, upon adapting its coefficients to generate adapted coefficient values based on the audio data 302 and the reference data 304, the adaptive neural network portion 210 in the first stage 340 can provide the adapted coefficient values to the adaptive neural network portion 210 in the second stage 342 (e.g., if different than the adaptive neural network portion in the first stage 340) or can maintain the adapted coefficient values for use in the second stage 342 (e.g., if the same adaptive neural network portion is implemented at both stages).

Thus, in some cases, rather than using initial and/or default values, the adaptive neural network portion 210 in the second stage 342 can start with the adapted coefficient values (e.g., from the adaptive neural network portion in the first stage 340) as the initial values of its coefficients. The adaptive neural network portion 210 can further tune the adapted coefficient values based on the audio data 302, the reference data 304, and the audio data 308 input into the adaptive neural network portion 210 in the second stage 342, to derive its own set of additionally adapted coefficient values. The adaptive neural network portion 210 in the second stage 342 can provide the additionally adapted coefficient values it derives to the adaptive neural network portion 210 in the third stage 344, which can similarly tune the additionally adapted coefficient values as previously described with respect to the adaptive neural network portion 210 in the second stage 342.

In some cases, if the third stage 344 is the last stage of the cascaded audio processing stages 300, the adaptive neural network portion 210 in the third stage 344 can feed its own set of adapted coefficient values back to the adaptive neural network portion 210 in the first stage 340 for use during a next coefficients update by the adaptive neural network portion 210 in the first stage 340. In this way, tuning the coefficients of the adaptive neural network portion at each stage can become increasingly efficient and can reduce processing latency by starting with improved and/or near-optimal coefficient values at each of stage.

Figure 4:
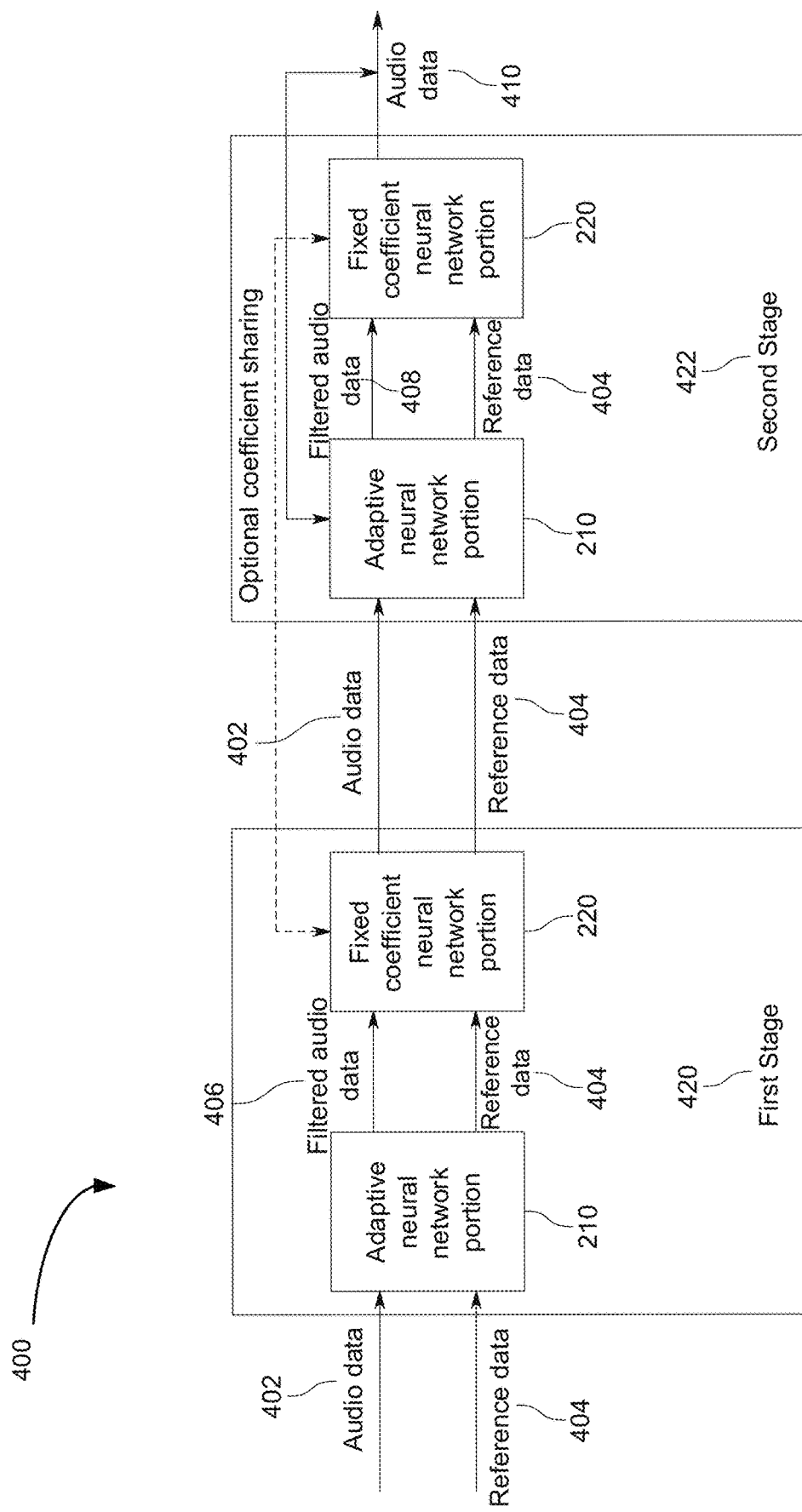
FIG. 4 is a diagram illustrating an example feedback loop between an adaptive neural network portion and a fixed coefficient neural network portion of a hybrid neural network, in accordance with some examples of the present disclosure.

FIG. 4 is a diagram illustrating an example feedback loop 400 between adaptive neural and fixed coefficient neural network portions. In this example, a hybrid neural network (e.g., hybrid neural network 132) can implement adaptive and fixed coefficient neural network portions in two coupled stages. The first stage 420 includes an adaptive neural network portion 210 and a fixed coefficient neural network portion 220, which can be the same or different as the adaptive neural network portion 210 and the fixed coefficient neural network portion 220 in the first stage 340 of the cascaded audio processing stages 300 shown in FIG. 3. The second stage 422 includes an adaptive neural network portion 210 and a fixed coefficient neural network portion 220, which can be the same or different as the adaptive neural network portion 210 and the fixed coefficient neural network portion 220 in the second stage 342 of the cascaded audio processing stages 300 shown in FIG. 3.

The adaptive neural network portion 210 in the first stage 420 can receive audio data 402 and reference data 404. The audio data 402 can include speech data, noise data, linear echo data, and non-linear echo data. The adaptive neural network portion 210 in the first stage 420 can then output filtered audio data 406 that filters out the linear echo data from the audio data 402. The fixed coefficient neural network portion 220 in the first stage 420 can process the filtered audio data 406 and the reference data 404, and output audio data 402 that includes extracted speech data, as previously described.

The adaptive neural network portion 210 in the second stage 422 can receive the audio data 402, the reference data 404, and a third input that includes extracted speech data. In this example, a feedback loop exists between the fixed coefficient neural network portion 220 in the second stage 422 and the adaptive neural network portion 210 in the second stage 422. Here, the adaptive neural network portion 210 in the second stage 422 can receive the third input (e.g., the extracted speech) from the fixed coefficient neural network portion 220 in the second stage 422 via the feedback loop. In some examples, the third input to the adaptive neural network portion 210 in the second stage 422 can include audio data 410 generated by the fixed coefficient neural network portion 220 in the second stage 422 based on the reference data 404 and filtered audio data 408 generated by the adaptive neural network portion 210 in the second stage 422. The filtered audio data 408 can include speech data, noise data, and non-linear echo data.

To generate the filtered audio data 408, the adaptive neural network portion 210 in the second stage 422 can use the audio data 402, the reference data 404, the audio data 410 from the fixed coefficient neural network portion 220 in the second stage 422, and its adapted coefficients (e.g., the adapted coefficients implemented by the adaptive neural network portion 210 in the second stage 422) to remove the linear echo data from the audio data 402. In some examples, based on its inputs (e.g., the audio data 402, the reference data 404, and the audio data 410), the adaptive neural network portion 210 in the second stage 422 can adapt its coefficients and filter out (e.g., remove completely or remove a best approximation) the linear echo data in the audio data 402, and output the filtered audio data 408 to the fixed coefficient neural network portion 220 in the second stage 422. The filtered audio data 408 can include speech data, noise data, and non-linear echo data.

Next, the fixed coefficient neural network portion 220 in the second stage 422 can output audio data 410 including extracted speech data. In some examples, the audio data 410 generated by the fixed coefficient neural network portion 220 in the second stage 422 can be fed back to the adaptive neural network portion 210 in the second stage 422. In some examples, such feedback can be performed as described above in an iterative manner. After a maximum or certain number of audio processing iterations in the second stage 422, the fixed coefficient neural network portion 220 in the second stage 422 can generate a final output of extracted speech data.

In some cases, the fixed coefficient neural network portion 220 in the first stage 420 and the second stage 422 can share coefficients as previously described with respect to FIG. 3. Similarly, in some cases, the adaptive neural network portion 210 in the first stage 420 and the second stage 422 can share coefficients as previously explained with respect to FIG. 3.

The number of stages shown in FIG. 4 is merely an illustrative example provided for explanation purposes. Other examples may include a different number of stages than shown in FIG. 4. Moreover, in some cases, a feedback loop as described above can be implemented by more stages than shown in FIG. 4.

FIG. 5 is a flowchart illustrating an example process 500 for extracting speech data from audio data using a hybrid neural network system (e.g., hybrid neural network 132).

At block 502, the process 500 can include receiving, by a first neural network portion (e.g., adaptive neural network portion 210 or an instance thereof) of a hybrid neural network system, an input comprising audio data (e.g., audio data 202) and reference data (e.g., reference data 204). In some examples, the audio data can include speech data, noise data, and echo data. In some examples, the echo data can include linear echo data and non-linear echo data.

At block 504, the process 500 can include filtering, by the first neural network portion, a portion of the audio data based on adapted coefficients of the first neural network portion. In some examples, the portion of the audio data can include at least a portion of the noise data and/or the echo data. The adapted coefficients can include coefficients adjusted based on the input including the audio data and the reference data. In some cases, the adapted coefficients can include coefficients adapted based on the input and/or the output of the first neural network portion.

In some cases, the echo data can include non-linear echo data and linear echo data, and the portion filtered by the first neural network portion can include the linear echo data.

In some examples, the reference data can include far end echo data. In some cases, the adapted coefficients of the first neural network portion can include linear coefficients that are adapted based on an approximation of the linear echo data. In some examples, the approximation of the linear echo data can be based on the far end echo data.

The linear echo data can be linearly related to the far end echo data. In some examples, to remove the linear echo data from the audio data, the first neural network portion can subtract the far end echo data from the audio data. In some cases, the first neural network portion can use the reference data and the linear relationship between the linear echo data and the reference data to approximate and remove the linear echo data.

In some examples, the first neural network portion can adjust/tune its coefficients on demand (e.g., in real time). For example, the first neural network portion can receive the audio data and adjust its coefficients in real time to generate the adapted coefficients.

In some cases, the coefficients of the first neural network portion can include linear coefficients that are adapted by at least approximating linear echo data in the audio data. In some examples, the linear echo data can be approximated based on far end echo reference data (e.g., the reference data).

At block 506, the process 500 can include, based on the filtering of the portion of the audio data, generating, by the first neural network portion, filtered audio data including the speech data and an unfiltered portion of the noise data and/or the echo data. In some examples, the unfiltered portion of the noise data and/or the echo data can include non-linear echo data. For example, the filtered audio data can include speech data and non-linear echo data that was not removed by the filtering of the portion of the audio data.

In some cases, the unfiltered portion of the noise data and/or the echo data can include the non-linear echo data, and the filtered audio data can include the speech data, the noise data and the non-linear echo data.

At block 508, the process 500 can include, based on the filtered audio data and the reference data, extracting, by a second neural network portion (e.g., fixed coefficient neural network portion 220 or an instance thereof) of the hybrid neural network system, the speech data from the filtered audio data. For example, the second neural network portion can remove the unfiltered portion of the noise data and/or the echo data from the filtered audio data. To illustrate, in some examples, to extract the speech data from the filtered audio date, the second neural network portion can filter out non-linear echo data from the filtered audio data.

In some examples, the extracted speech data (e.g., speech data 134, output speech data 208, output speech 262, audio data 316, audio data 410) can be the same as or a best approximation of the speech data included in the audio data in the input. In some cases, the second neural network portion can be trained offline based on training data that corresponds to a type(s) of data processed/output by the first neural network portion.

In some cases, the first neural network portion can include an adaptive coefficient neural network, and the second neural network portion can include a fixed coefficient neural network portion. In some examples, the adaptive coefficient neural network and the fixed coefficient neural network portion can be interconnected parts of the hybrid neural network system.

In some examples, the process 500 can include outputting, by the second neural network portion, the extracted speech data. In some cases, the process 500 can include storing the extracted speech data and/or providing the extracted speech data to an electronic device such as, for example, a speaker device, a processor, a computer system, etc.

In some aspects, the process 500 can include filtering, based on the extracted speech data, an additional portion of the noise data and/or the echo data. In some cases, filtering the additional portion can include providing, by the second neural network portion to the first neural network portion, feedback including the extracted speech data.

In some cases, filtering the additional portion can include providing the extracted speech data and the input to a third neural network (e.g., adaptive neural network portion 210 or an instance thereof) of the hybrid neural network system; based on additional adapted coefficients of the third neural network, filtering, by the third neural network, a different portion of the noise data and/or echo data; and generating, by the third neural network, different filtered audio data including the speech data. In some aspects, the process 500 can include providing, to a fourth neural network (e.g., fixed coefficient neural network portion 220 or an instance thereof) of the hybrid neural network system, the different filtered audio data and the reference data; and outputting, by the fourth neural network, different extracted speech data based on the different filtered audio data and the reference data.

In some cases, filtering the portion of the audio data can include iteratively approximating the adapted coefficients. In some examples, a first iteration can implement initial coefficient values for the coefficients, and the adapted coefficients can be generated at one or more additional iterations.

In some aspects, the process 500 can include receiving second audio data; and based on the second audio data, re-approximating, by the first neural network portion, the adapted coefficients. In some examples, the re-approximating can start with the adapted coefficients as the initial coefficient values.

In some aspects, the process 500 can include receiving second audio data; and based on the second audio data, generating, by the first neural network portion, second filtered audio data based on the adapted coefficients.

In some examples, the hybrid neural network system can include a feedback loop from the second neural network portion to the first neural network portion. In some cases, the hybrid neural network system can include a plurality of cascaded audio processing stages (e.g., cascaded audio processing stages 300). In some examples, the first neural network portion and the second neural network portion can form a first audio processing stage (e.g., first stage 340, first stage 420).

In some examples, a second audio processing stage (e.g., second stage 342, second stage 422) of the plurality of cascaded audio processing stages can include a third neural network (e.g., adaptive neural network portion 210 or an instance thereof) that adapts coefficients of the third neural network based on the audio data, the reference data, and the extracted speech data; filters, based on the adapted coefficients of the third neural network, at least a different portion of the noise data and/or the echo data; and outputs different filtered audio data that includes the speech data. In some cases, the second audio processing stage can include a fourth neural network (e.g., fixed coefficient neural network portion 220 or an instance thereof) that outputs different speech data based on the different filtered audio data and the reference data.

In some examples, the processes described herein (e.g., process 500, and/or any other process described herein) may be performed by a computing device or apparatus. In one example, the process 500 can be performed by the computing device 100 of FIG. 1. In another example, the process 500 can be performed by the computing system having the computing device architecture 600 shown in FIG. 6. For instance, a computing device with the computing device architecture 600 shown in FIG. 6 can implement the operations of FIG. 5 and/or the components and/or operations described herein with respect to any of FIGS. 1 through 5.

The computing device can include any suitable device, such as a mobile device (e.g., a mobile phone), a desktop computing device, a tablet computing device, a wearable device (e.g., a VR headset, an AR headset, smart glasses, a network-connected watch or smartwatch, or other wearable device), a server computer, an autonomous vehicle or computing device of an autonomous vehicle, a robotic device, a laptop computer, a smart television, a camera, a tablet computer, a desktop computer, a gaming system, an audio system, and/or any other computing device with the resource capabilities to perform the processes described herein, including the process 500 and/or any other process described herein. In some cases, the computing device or apparatus may include various components, such as one or more input devices, one or more output devices, one or more processors, one or more microprocessors, one or more microcomputers, one or more cameras, one or more sensors, one or more microphones, one or more speakers, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 500 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 6:
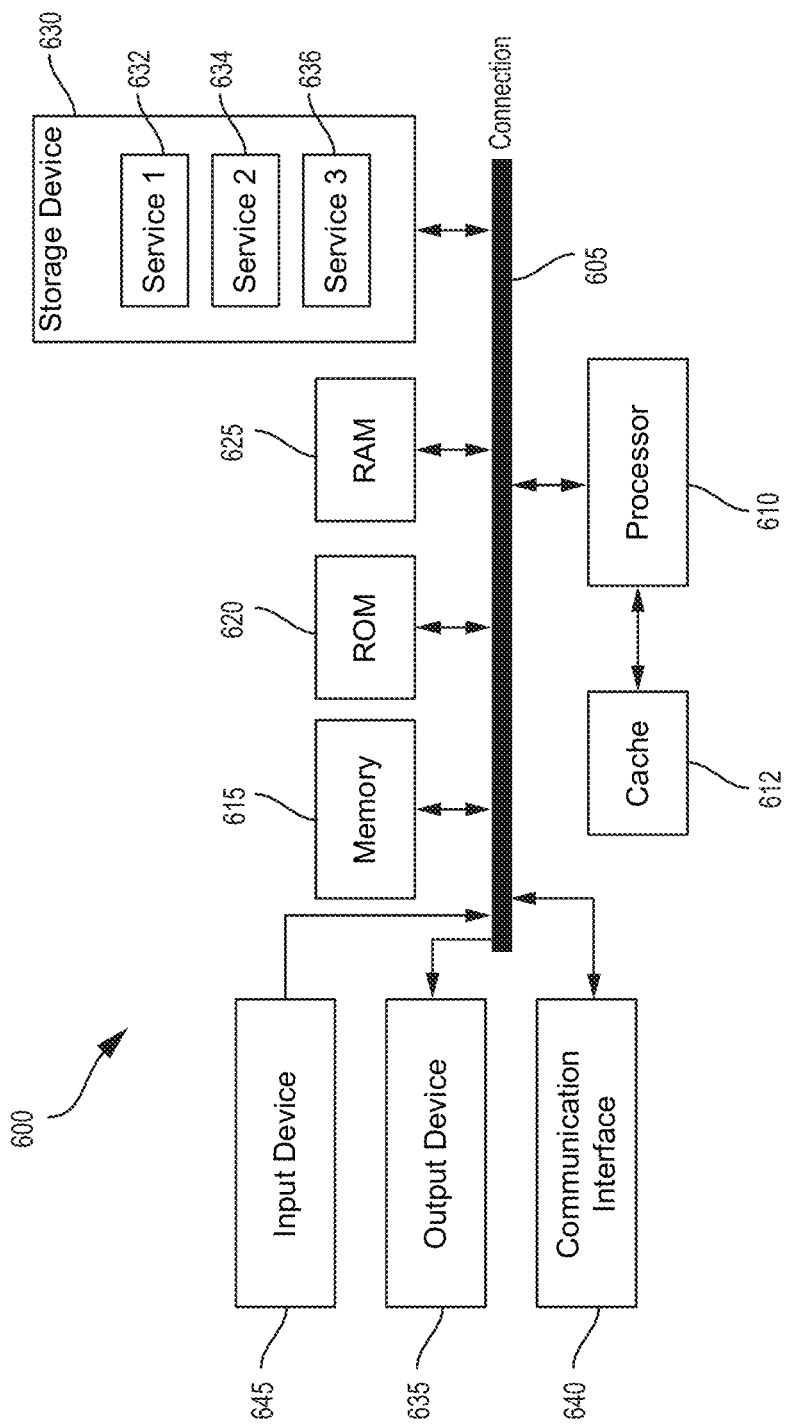
FIG. 6 is a diagram illustrating an example computing system, in accordance with some examples of the present disclosure.

FIG. 6 illustrates an example computing device architecture 600 of an example computing device which can implement various techniques described herein. For example, the computing device architecture 600 can implement at least some portions of the computing device 100 shown in FIG. 1. The components of the computing device architecture 600 are shown in electrical communication with each other using a connection 605, such as a bus. The example computing device architecture 600 includes a processing unit (CPU or processor) 610 and a computing device connection 605 that couples various computing device components including the computing device memory 615, such as read only memory (ROM) 620 and random access memory (RAM) 625, to the processor 610.

The computing device architecture 600 can include a cache of high-speed memory connected directly with, in close proximity to, or integrated as part of the processor 610. The computing device architecture 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other computing device memory 615 may be available for use as well. The memory 615 can include multiple different types of memory with different performance characteristics. The processor 610 can include any general purpose processor and a hardware or software service (e.g., service 1 632, service 2 634, and service 3 636) stored in storage device 630 and configured to control the processor 610 as well as a special-purpose processor where software instructions are incorporated into the processor design. The processor 610 may be a self-contained system, containing multiple cores or processors, a bus, memory controller, cache, etc. A multi-core processor may be symmetric or asymmetric.

To enable user interaction with the computing device architecture 600, an input device 645 can represent any number of input mechanisms, such as a microphone for speech, a touch-sensitive screen for gesture or graphical input, keyboard, mouse, motion input, speech and so forth.

An output device 635 can also be one or more of a number of output mechanisms known to those of skill in the art, such as a display, projector, television, speaker device. In some instances, multimodal computing devices can enable a user to provide multiple types of input to communicate with the computing device architecture 600. The communication interface 640 can generally govern and manage the user input and computing device output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof. The storage device 630 can include service 632, service 634, and service 636 for controlling the processor 610. Other hardware or software modules are contemplated. The storage device 630 can be connected to the computing device connection 605. In one aspect, a hardware module that performs a particular function can include the software component stored in a computer-readable medium in connection with the necessary hardware components, such as the processor 610, connection 605, output device 635, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language in the disclosure reciting an element (or multiple elements) "and/or" another element in a set of elements indicates that one of the elements of the set, multiple elements of the set (in any combination), or all elements of the set satisfy the claim (and/or are included by the language). Similarly, claim language or other language in the disclosure reciting an element (or multiple elements) "or" another element in a set of elements indicates that one of the elements of the set, multiple elements of the set (in any combination), or all elements of the set satisfy the claim (and/or are included by the language). For example, claim language reciting "A and/or B" or "A or B" means A, B, or A and B. In another example, claim language reciting "A, B, or C" or "A, B, or C" means A, B, C, or A and B, or A and C, or B and C, or A and B and C. The language "and/or" and the language "or" included in a set does not limit the set to the items listed in the set. For example, claim language reciting "A and/or B" or reciting "A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative Examples of the Disclosure Include

Aspect 1: An apparatus comprising: memory; and one or more processors coupled to the memory, the one or more processors being configured to: receive, by a first neural network portion of a hybrid neural network system, an input comprising audio data and reference data, the audio data comprising speech data, noise data, and echo data; filter, by the first neural network portion, a portion of the audio data based on adapted coefficients of the first neural network portion, the portion of the audio data comprising at least one of the noise data and/or the echo data, the adapted coefficients comprising coefficients adjusted based on the input and/or an output of the first neural network portion; generate, by the first neural network portion based on the filtering of the portion of the audio data, filtered audio data comprising the speech data and an unfiltered portion of at least one of the noise data and/or the echo data; and extract, by a second neural network portion of the hybrid neural network system based on the filtered audio data and the reference data, the speech data from the filtered audio data.

Aspect 2: The apparatus of Aspect 1, wherein the echo data comprises non-linear echo data and linear echo data, and wherein the portion filtered by the first neural network portion comprises the linear echo data.

Aspect 3: The apparatus of Aspect 2, wherein the reference data comprises far end echo data, wherein the adapted coefficients of the first neural network portion are linear coefficients that are adapted based on an approximation of the linear echo data, the approximation of the linear echo data being based on the far end echo data.

Aspect 4: The apparatus of any of Aspects 2 to 3, wherein the unfiltered portion of at least one of the noise data and/or the echo data comprises the non-linear echo data, and wherein the filtered audio data comprises the speech data, the noise data and the non-linear echo data.

Aspect 5: The apparatus of any of Aspects 1 to 4, wherein the first neural network portion comprises an adaptive neural network portion, and wherein the second neural network portion comprises a fixed coefficient neural network portion.

Aspect 6: The apparatus of any of Aspects 1 to 5, wherein the one or more processors are configured to: filter, based on the extracted speech data, an additional portion of at least one of the noise data and/or the echo data.

Aspect 7: The apparatus of Aspect 6, wherein, to filter the additional portion of at least one of the noise data and/or the echo data, the one or more processors are configured to: provide, by the second neural network portion to the first neural network portion, feedback comprising the extracted speech data.

Aspect 8: The apparatus of Aspect 6, wherein, to filter the additional portion of at least one of the noise data and/or the echo data, the one or more processors are configured to: provide the extracted speech data and the input to a third neural network portion of the hybrid neural network system; filter, by the third neural network portion based on additional adapted coefficients of the third neural network portion, a different portion of at least one of the noise data and/or echo data; and generate, by the third neural network portion, different filtered audio data comprising the speech data.

Aspect 9: The apparatus of Aspect 8, wherein the one or more processors are configured to: provide, to a fourth neural network portion of the hybrid neural network system, the different filtered audio data and the reference data; and output, by the fourth neural network portion, different extracted speech data based on the different filtered audio data and the reference data.

Aspect 10: The apparatus of any of Aspects 1 to 9, wherein the first neural network portion receives the audio data and adjusts the coefficients in real time to generate the adapted coefficients.

Aspect 11: The apparatus of any of Aspects 1 to 10, wherein to filter the portion of the audio data, the one or more processors are configured to: iteratively approximate the adapted coefficients, wherein a first iteration implements initial coefficient values for the coefficients, and wherein the adapted coefficients are generated at one or more additional iterations.

Aspect 12: The apparatus of Aspect 11, wherein the one or more processors are configured to: receive second audio data; and re-approximate, by the first neural network portion based on the second audio data, the adapted coefficients, the re-approximating starting with the adapted coefficients as the initial coefficient values.

Aspect 13: The apparatus of Aspect 11, wherein the one or more processors are configured to: receive second audio data; and generate, by the first neural network portion based on the second audio data, second filtered audio data based on the adapted coefficients.

Aspect 14: The apparatus of any of Aspects 1 to 13, wherein the apparatus comprises a mobile device.

Aspect 15: The apparatus of any of Aspects 1 to 14, wherein the apparatus comprises at least one of a microphone and/or a speaker device.

Aspect 16: A method comprising: receiving, by a first neural network portion of a hybrid neural network system, an input comprising audio data and reference data, the audio data comprising speech data, noise data, and echo data; filtering, by the first neural network portion, a portion of the audio data based on adapted coefficients of the first neural network portion, the portion of the audio data comprising at least one of the noise data and/or the echo data, the adapted coefficients comprising coefficients adjusted based on the input and/or an output of the first neural network portion; generating, by the first neural network portion based on the filtering of the portion of the audio data, filtered audio data comprising the speech data and an unfiltered portion of at least one of the noise data and/or the echo data; and extracting, by a second neural network portion of the hybrid neural network system based on the filtered audio data and the reference data, the speech data from the filtered audio data.

Aspect 17: The method of Aspect 16, wherein the echo data comprises non-linear echo data and linear echo data, and wherein the portion filtered by the first neural network portion comprises the linear echo data.

Aspect 18: The method of Aspect 17, wherein the reference data comprises far end echo data, wherein the adapted coefficients of the first neural network portion are linear coefficients that are adapted based on an approximation of the linear echo data, the approximation of the linear echo data being based on the far end echo data.

Aspect 19: The method of any of Aspects 17 to 18, wherein the unfiltered portion of at least one of the noise data and/or the echo data comprises the non-linear echo data, and wherein the filtered audio data comprises the speech data, the noise data and the non-linear echo data.

Aspect 20: The method of any of Aspects 16 to 19, wherein the first neural network portion comprises an adaptive neural network portion, and wherein the second neural network portion comprises a fixed coefficient neural network portion.

Aspect 21: The method of any of Aspects 16 to 20, further comprising: filtering, based on the extracted speech data, an additional portion of at least one of the noise data and/or the echo data.

Aspect 22: The method of Aspect 21, wherein filtering the additional portion of at least one of the noise data and/or the echo data comprises: providing, by the second neural network portion to the first neural network portion, feedback comprising the extracted speech data.

Aspect 23: The method of Aspect 21, wherein filtering the additional portion of at least one of the noise data and/or the echo data comprises: providing the extracted speech data and the input to a third neural network portion of the hybrid neural network system; filtering, by the third neural network portion based on additional adapted coefficients of the third neural network portion, a different portion of at least one of the noise data and/or echo data; and generating, by the third neural network portion, different filtered audio data comprising the speech data.

Aspect 24: The method of Aspect 23, further comprising: providing, to a fourth neural network portion of the hybrid neural network system, the different filtered audio data and the reference data; and outputting, by the fourth neural network portion, different extracted speech data based on the different filtered audio data and the reference data.

Aspect 25: The method of any of Aspects 16 to 24, wherein the first neural network portion receives the audio data and adjusts the coefficients in real time to generate the adapted coefficients.

Aspect 26: The method of any of Aspects 16 to 25, wherein filtering the portion of the audio data comprises: iteratively approximating the adapted coefficients, wherein a first iteration implements initial coefficient values for the coefficients, and wherein the adapted coefficients are generated at one or more additional iterations.

Aspect 27: The method of Aspect 26, further comprising: receiving second audio data; and re-approximating, by the first neural network portion based on the second audio data, the adapted coefficients, the re-approximating starting with the adapted coefficients as the initial coefficient values.

Aspect 28: The method of Aspect 26, further comprising: receiving second audio data; and generating, by the first neural network portion based on the second audio data, second filtered audio data based on the adapted coefficients.

Aspect 29: A non-transitory computer-readable medium having stored thereon instructions that, when executed by one or more processors, cause the one or more processors to perform a method according to any of Aspects 16 to 28.

Aspect 30: An apparatus comprising means for performing a method according to any of Aspects 16 to 28.

What is claimed is:

1. An apparatus comprising:
   memory; and
   one or more processors coupled to the memory, the one or more processors being configured to:
   receive, by a first neural network portion of a hybrid neural network system, an input comprising audio data and reference data, the audio data comprising speech data, noise data, and echo data;
   filter, by the first neural network portion, a portion of the audio data based on adapted coefficients of the first neural network portion, the portion of the audio data comprising at least one of the noise data and/or the echo data, the adapted coefficients comprising coefficients adjusted based on the input and/or an output of the first neural network portion;

generate, by the first neural network portion based on the filtering of the portion of the audio data, filtered audio data comprising the speech data and an unfiltered portion of at least one of the noise data and/or the echo data; and extract, by a second neural network portion of the hybrid neural network system based on the filtered audio data and the reference data, the speech data from the filtered audio data.

2. The apparatus of claim 1, wherein the echo data comprises non-linear echo data and linear echo data, and wherein the portion filtered by the first neural network portion comprises the linear echo data.

3. The apparatus of claim 2, wherein the reference data comprises far end echo data, wherein the adapted coefficients of the first neural network portion are linear coefficients that are adapted based on an approximation of the linear echo data, the approximation of the linear echo data being based on the far end echo data.

4. The apparatus of claim 2, wherein the unfiltered portion of at least one of the noise data and/or the echo data comprises the non-linear echo data, and wherein the filtered audio data comprises the speech data, the noise data and the non-linear echo data.

5. The apparatus of claim 1, wherein the first neural network portion comprises an adaptive neural network portion, and wherein the second neural network portion comprises a fixed coefficient neural network portion.

6. The apparatus of claim 1, wherein the one or more processors are configured to:
filter, based on the extracted speech data, an additional portion of at least one of the noise data and/or the echo data.

7. The apparatus of claim 6, wherein, to filter the additional portion of at least one of the noise data and/or the echo data, the one or more processors are configured to:
provide, by the second neural network portion to the first neural network portion, feedback comprising the extracted speech data.

8. The apparatus of claim 6, wherein, to filter the additional portion of at least one of the noise data and/or the echo data, the one or more processors are configured to:
provide the extracted speech data and the input to a third neural network portion of the hybrid neural network system;
filter, by the third neural network portion based on additional adapted coefficients of the third neural network portion, a different portion of at least one of the noise data and/or the echo data; and
generate, by the third neural network portion, different filtered audio data comprising the speech data.

9. The apparatus of claim 8, wherein the one or more processors are configured to:
provide, to a fourth neural network portion of the hybrid neural network system, the different filtered audio data and the reference data; and
output, by the fourth neural network portion, different extracted speech data based on the different filtered audio data and the reference data.

10. The apparatus of claim 1, wherein the first neural network portion receives the audio data and adjusts the coefficients in real time to generate the adapted coefficients.

11. The apparatus of claim 1, wherein to filter the portion of the audio data, the one or more processors are configured to:
iteratively approximate the adapted coefficients, wherein a first iteration implements initial coefficient values for the coefficients, and wherein the adapted coefficients are generated at one or more additional iterations.

12. The apparatus of claim 11, wherein the one or more processors are configured to:
receive second audio data; and
re-approximate, by the first neural network portion based on the second audio data, the adapted coefficients, the re-approximating starting with the adapted coefficients as the initial coefficient values.

13. The apparatus of claim 11, wherein the one or more processors are configured to:
receive second audio data; and
generate, by the first neural network portion based on the second audio data, second filtered audio data based on the adapted coefficients.

14. The apparatus of claim 1, wherein the apparatus comprises a mobile device.

15. The apparatus of claim 1, wherein the apparatus comprises at least one of a microphone and/or a speaker device.

16. A method comprising:
receiving, by a first neural network portion of a hybrid neural network system, an input comprising audio data and reference data, the audio data comprising speech data, noise data, and echo data;
filtering, by the first neural network portion, a portion of the audio data based on adapted coefficients of the first neural network portion, the portion of the audio data comprising at least one of the noise data and/or the echo data, the adapted coefficients comprising coefficients adjusted based on the input and/or an output of the first neural network portion;
generating, by the first neural network portion based on the filtering of the portion of the audio data, filtered audio data comprising the speech data and an unfiltered portion of at least one of the noise data and/or the echo data; and
extracting, by a second neural network portion of the hybrid neural network system based on the filtered audio data and the reference data, the speech data from the filtered audio data.

17. The method of claim 16, wherein the echo data comprises non-linear echo data and linear echo data, and wherein the portion filtered by the first neural network portion comprises the linear echo data.

18. The method of claim 17, wherein the reference data comprises far end echo data, wherein the adapted coefficients of the first neural network portion are linear coefficients that are adapted based on an approximation of the linear echo data, the approximation of the linear echo data being based on the far end echo data.

19. The method of claim 17, wherein the unfiltered portion of at least one of the noise data and/or the echo data comprises the non-linear echo data, and wherein the filtered audio data comprises the speech data, the noise data and the non-linear echo data.

20. The method of claim 16, wherein the first neural network portion comprises an adaptive neural network portion, and wherein the second neural network portion comprises a fixed coefficient neural network portion.

21. The method of claim 16, further comprising:
filtering, based on the extracted speech data, an additional portion of at least one of the noise data and/or the echo data.

22. The method of claim 21, wherein filtering the additional portion of at least one of the noise data and/or the echo data comprises:

providing, by the second neural network portion to the first neural network portion, feedback comprising the extracted speech data.

23. The method of claim 21, wherein filtering the additional portion of at least one of the noise data and/or the echo data comprises:
providing the extracted speech data and the input to a third neural network portion of the hybrid neural network system;
filtering, by the third neural network portion based on additional adapted coefficients of the third neural network portion, a different portion of at least one of the noise data and/or the echo data; and
generating, by the third neural network portion, different filtered audio data comprising the speech data.

24. The method of claim 23, further comprising:
providing, to a fourth neural network portion of the hybrid neural network system, the different filtered audio data and the reference data; and
outputting, by the fourth neural network portion, different extracted speech data based on the different filtered audio data and the reference data.

25. The method of claim 16, wherein the first neural network portion receives the audio data and adjusts the coefficients in real time to generate the adapted coefficients.

26. The method of claim 16, wherein filtering the portion of the audio data comprises:
iteratively approximating the adapted coefficients, wherein a first iteration implements initial coefficient values for the coefficients, and wherein the adapted coefficients are generated at one or more additional iterations.

27. The method of claim 26, further comprising:
receiving second audio data; and
re-approximating, by the first neural network portion based on the second audio data, the adapted coefficients, the re-approximating starting with the adapted coefficients as the initial coefficient values.

28. The method of claim 26, further comprising:
receiving second audio data; and
generating, by the first neural network portion based on the second audio data, second filtered audio data based on the adapted coefficients.

29. A non-transitory computer-readable medium having stored thereon instructions that, when executed by one or more processors, cause the one or more processors to:
receive, by a first neural network portion of a hybrid neural network system, an input comprising audio data and reference data, the audio data comprising speech data, noise data, and echo data;
filter, by the first neural network portion, a portion of the audio data based on adapted coefficients of the first neural network portion, the portion of the audio data comprising at least one of the noise data and/or the echo data, the adapted coefficients comprising coefficients adjusted based on the input and/or an output of the first neural network portion;
generate, by the first neural network portion based on the filtering of the portion of the audio data, filtered audio data comprising the speech data and an unfiltered portion of at least one of the noise data and/or the echo data; and
extract, by a second neural network portion of the hybrid neural network system based on the filtered audio data and the reference data, the speech data from the filtered audio data.

30. The non-transitory computer-readable medium of claim 29, wherein the echo data comprises non-linear echo data and linear echo data, and wherein the portion filtered by the first neural network portion comprises the linear echo data.

* * * * *